(12) United States Patent
Lee et al.

(10) Patent No.: US 6,950,941 B1
(45) Date of Patent: Sep. 27, 2005

(54) COPY PROTECTION SYSTEM FOR PORTABLE STORAGE MEDIA

(75) Inventors: Chang-Hyi Lee, Suwon (KR); Ho-Suk Chung, Suwon (KR); Eun-Seong Kang, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/302,431

(22) Filed: Apr. 30, 1999

(30) Foreign Application Priority Data

Sep. 24, 1998 (KR) .................................. 98-39808
Sep. 24, 1998 (KR) .................................. 98-39809

(51) Int. Cl.[7] .......................... H04L 9/00; H04L 9/32; G06F 11/30; G06F 12/14
(52) U.S. Cl. ...................... 713/193; 713/189; 713/156; 713/173; 713/175
(58) Field of Search ............................... 713/193, 189, 713/156, 173, 175

(56) References Cited

U.S. PATENT DOCUMENTS 5,677,953 A * 10/1997 Dolphin ....................... 705/51
6,041,314 A * 3/2000 Davis ........................... 705/41
6,574,609 B1 * 6/2003 Downs et al. ................. 705/50

* cited by examiner

Primary Examiner—Gilberto Barron
Assistant Examiner—Benjamin E. Lanier
(74) Attorney, Agent, or Firm—Robert E. Bushnell, Esq.

(57) ABSTRACT

Systems connected to users generate a plurality of keys which are mutually shared, and download and upload digital contents by using secret channels formed between the systems. An information provider receives an authorization from a certificate authority. A licensed SDMI compliant module (LCM) is authenticated through the information provider, and the information provider and the LCM form a channel. A portable device is authenticated from the information provider through the LCM, and the LCM and the portable device form a channel. The digital content between the LCM and the portable device is downloaded and uploaded according to respective control state data of the LCM and the portable device. The system can use a physical address of a bad sector formed in the portable medium during the manufacturing process for preventing an illegal copy of the downloaded digital contents through the portable device after the digital contents have been downloaded.

38 Claims, 9 Drawing Sheets

COPY PROTECTION SYSTEM FOR PORTABLE STORAGE MEDIA

CLAIM FOR PRIORITY

This application makes reference to, incorporates the same herein, and claims all rights accruing thereto under 35 U.S.C. §119 through our patent applications entitled *The Digital Content Encryption Apparatus And Method Thereof* earlier filed on the 24$^{th}$ day of Sep. 1998 in the Korean Industrial Property Office and there duly assigned Serial Nos. 1998/39808 and 1998/39809.

FIELD OF THE INVENTION

The present invention is generally related to encryption processes and apparatus, and, more particularly, to secure and robust processes and apparatus for the generation and use of keys in the transmission and replay of digital information for licensed Secure Digital Music Initiative (SDMI) compliant modules such as personal computers and SDMI compliant portable devices in conjunction with Internet service content provider and a certificate authority.

BACKGROUND ART

Recently, with the flood of information provided by various media such as broadcasting and press, an atmosphere has been created by the information providers who are interested in providing integrated information that covers all of the media. Other users want to selectively receive a specific item of digital information from the entire spectrum of information available from a particular information provider (IP). Accordingly, a digital content transmission system has been formed by the information providers who convert various types of information into a digital form and store this digital information, and the users who subscribe to this digital information system from the information provider via the network. Digital information transmission systems endow an application program with easy downloadability of the digital content. The user can get all the information desired by using this application program to access the digital information system through the network.

The digital information may be provided to the user either for pay or for free. In case of paid digital information, the server who provides the digital information via the transmission system sets the service fee. The service server charges the user according to the quantity of information used when the digital information is downloaded to the user. MPEG software protocol for example, compresses audio files to a fraction of their original size, but has little perceptible effect upon the quality of the audio sound. MPEG software protocol is now widely used by Internet sites offering digitalized music, and is reported to be commonly used to offer digitalized versions of recorded music without the consent of the musicians. When a user is connected to a server that provides digital information commercially via a network, a few of the users may be able to inadvertently or illegally copy the digital information, a practice that, as was recently noted by Interdeposit and the French Agency for the Protection of Programs, a member of the European Association of Authors and Information Technology Professional, in the *Patent, Trademark & Copyright Journal*, volume 57, No. 1416, page 385 (11 Mar. 1999), would be economically damaging to both the musicians and to the server who is running the digital information transmission system. Currently, the server, as well as the musicians, can do little more than seek redress by undertaking civil and criminal action in an effort to control the possibility of unlicensed reception of digital information. We have noticed that there is a need for a technique to preserve transmission security of revenue bearing information while restricting access to the information by unauthorized entities and preventing unauthorized users from using any of the information that they may be able to illicitly obtain from the information provider by restricting the ability of the unauthorized users to decrypting whatever information they manage to obtain via the system.

Also, it is difficult to prevent the illegal copy of the supplied digital contents or the CODEC recorded on the portable medium if the portable medium is copied after the digital content has been supplied to a user and recorded on the portable medium.

In particular, the MP3 which is the audio data of the above digital contents is downloaded to the first content output unit as well as the second content output unit such as an MP3 player and then reproduced. In the meantime, the MP3 is downloaded to a content storage unit such as a smartmedia card built in the first content output unit, and the MP3 downloaded in the content storage unit is reproduced through the second content output unit.

However, as stated above, there is a drawback in that the digital data downloaded to the first and second content output units and the content storage unit are easily copied to be illegally distributed.

SUMMARY OF THE INVENTION

It is therefore, one object of the present invention to provide improvements in cryptographic processes and apparatus.

It is another object to provide a secure and robust digital encryption process and apparatus.

It is yet another object to provide digital encryption processes and apparatus endowing a system with secure and robust copy protection for a licensed secure digital music initiative compliant module such as personal computers and portable devices such as disk and DVD players in conjunction with Internet service provider and a certificate authority.

It is still another object to provide digital encryption processes and apparatus able to encrypt and transmit digital information received from a transmission system, by the use of multiple cryptographic keys.

It is still yet another object to provide digital encryption processes and apparatus for generating and using multiple cryptographic keys during the transmission of digital information to a user.

It is a further object to provide digital encryption processes and apparatus that employ user information in the generation and use of multiple cryptographic keys during the transmission of digital information to the user.

It is a yet further object to provide digital encryption processes and apparatus able to encrypt and transmit digital information obtained from a transmission system by using multiple cryptographic keys, and to decrypt and play the digital information at the terminal of the user by using a plurality of keys, one of which is common to the multiple keys.

It is a still further object to provide digital encryption processes and apparatus able to encrypt and transmit digital information obtained from a transmission system by using key information, a user's key, and a temporary validation key, and to decrypt and play the digital information at the terminal of the user by using the key information and user authorization information.

It is still yet a further object to provide encryption, transmission and reception protocols enabling encryption, transmission and decryption of digital information received from a transmission system.

It is an additional object to provide encryption, transmission and reception protocols enabling encryption and transmission of digital information received from a transmission system by using multiple keys to encrypt the digital information, and decryption and replay of the digital information at the terminal of the user by using a plurality of keys, one of which is common to the multiple keys.

It is still yet a further object to provide encryption, transmission and reception protocols enabling encryption and transmission of digital information received from a transmission system, by using key information, a user's key, and a temporary validation key, and decryption and replay of the digital information at the terminal of the user by using the key information and user authorization information.

It is also an object to provide a more secure cryptograph and process for transmitting information to a terminal of a user who has requested the information.

It is also a further object to provide a cryptograph and process that reliably restricts the ability of a registered subscriber who has validly obtained information from an information provider, to deliver that information to another entity in a readily usable form.

These and other objects may be attained with an encryption process and apparatus that provides a secure and robust copy protection system for a licensed secure digital music initiative compliant module such as personal computers and portable devices, in conjunction with Iternet service providers and certificate authorities, by responding to a user's request for transmission of items of digital information to the user's terminal unit, by providing copy protection during downloading and during uploading of the digital contents. In order to prevent the digital contents from being copied illegally, a plurality of keys is generated and held by both the user and the digital content provider, and a secret channel is formed between both the user and the digital content provider. The header of the encrypted digital content is encrypted by using a physical address of a sector of a licensed SDMI compliant module such as a portable computer or a portable media device in order to prevent the digital content from being copied illegally after the digital content is recorded in the portable media.

The present invention includes a certificate authority, an information provider, a first content output unit, a second content output unit, and a manufacturer of the second output units.

The certificate authority generates, encrypts, and outputs a first authentication qualification key and a first authentication qualification key data, and generates a manufacturing key and manufacturing key information in response to a registration request signal from the manufacturer, The certificate authority forms a first table and a second table. The first table has a manufacturer key, a manufacturer key data, and information of the manufacturer key, and the second table has a token, a token information encrypted by the manufacturer key, the identification of a portable device or terminal.

The manufacturer of the second output units such portable devices sends a registration request signal to the certificate authority and receives the manufacturing key and manufacturing key data.

The internet service provider transmits the registration request signal to the certificate authority, stores the first authentication qualification key and the first authentication qualification key data inputted from the certificate authority in order to be authorized to supply the encrypted digital contents, and generates a second authentication qualification key and a second authentication qualification key data. The internet service provider outputs the second registration request signal to the certificate authority, The first content output unit such as a personal computer outputs the registration request signal to the internet service provider in order to receive the digital contents, stores the second authentication qualification key and the second authentication qualification key data, outputs the manufacturer key data to the internet service provider, encodes and outputs the manufacturer key detected from the second table in response to the manufacturer key data, and receives a public key, public key information and digital contents.

The second content output unit such as a portable device outputs the first registration request signal to the certificate authority and stores the manufacturer key and the manufacturer key data inputted from the certificate authority.

In addition of alternatively, the present invention may use a physical address of a bad sector formed in the portable recordable medium during the manufacturing process, encrypts a header of the encrypted digital contents stored in the portable recordable medium, and records the encrypted header on the physical address of the bad sector of the portable recordable medium for preventing an illegal copy of the downloaded digital contents through a terminal after the digital contents have been downloaded.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

Figure 1:
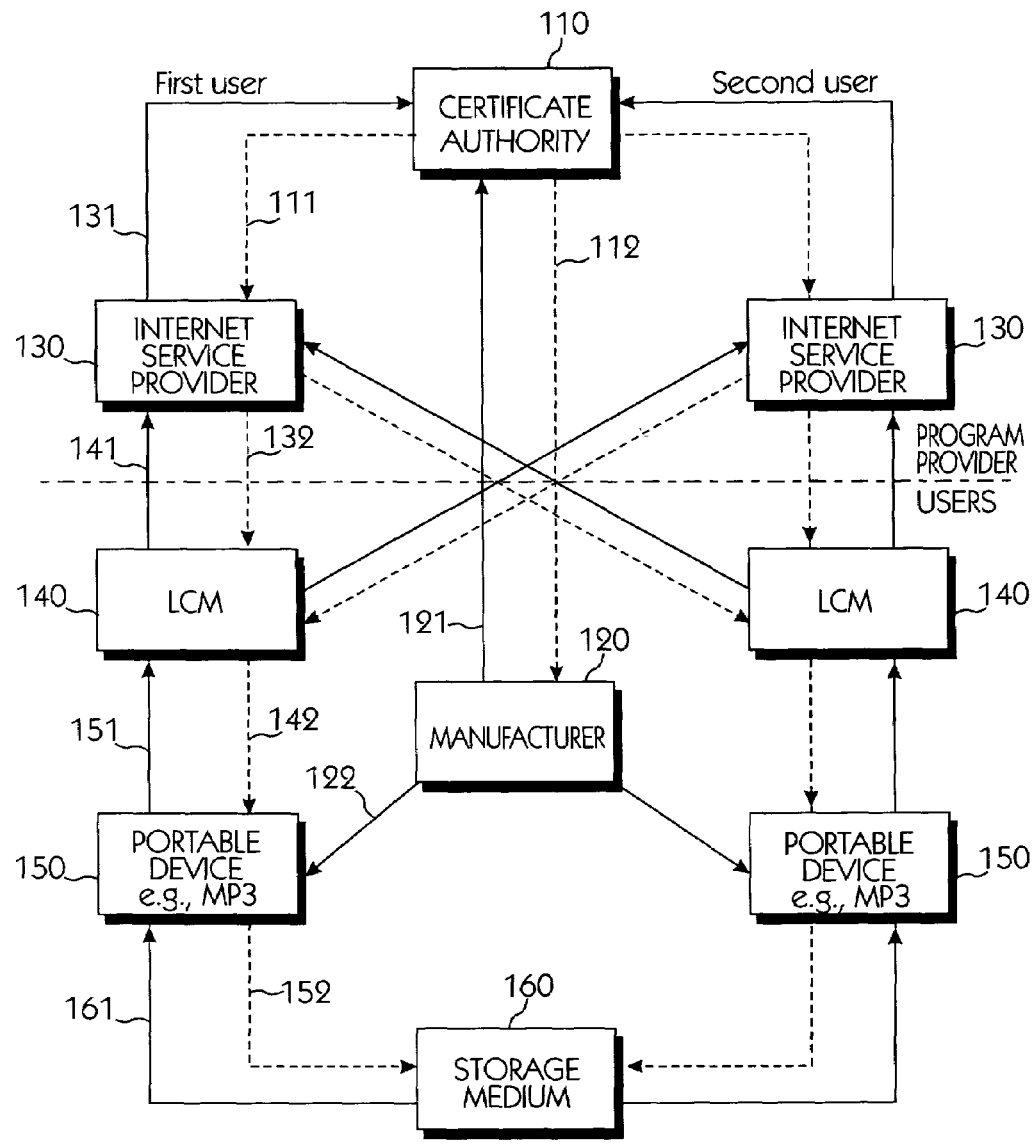
FIG. 1 is a block diagram illustrating the overall architecture of an implementation of the principles of the present invention.

For the removal of some ambiguities, in this section, we define some terminologies and list up some abbreviated words for a simple description.

First, we have to distinguish the two words, "Portability" and "Transferability" of a content.

Portability means that a content in a portable media (PM) can be played in any portable device (PD).

Transferability means that "portability" plus "upload of a content is allowed from a portable medium to even an LCM", in this case the content's uploadability is to be controlled by check-in/out system and its transferability status.

The digital contents which are used in the present invention mean all data including audio, video data, as well as character data such as song words, movie caption, and the like to be provided through internet.

Herein after we use the following abbreviated words.

CA stands for Certificate Authority (e.g., secure digital music initiative (SDMI), or other trust third party).

LCM stands for Licensed SDMI Compliant Module.

PD stands for SDMI Compliant Portable Device.

PDFM stands for Portable Device Functional Module.

ISP stands for Internet Service Provider (including Content Provider via the Internet).

PM stands for Portable Media (SDMI Compliant Storage Media).

Furthermore, here are presented some notations to be used in the following sections. Even though they are some intricate, we are sure that they would help the readers clearly understand the concrete method we intend. They are relevant to the algorithmic functional modules.

ECC—Elliptic Curve Cryptosystem $PryKey_A$, $PubKey_A$—Private Key and Public Key of A (this may be LCM, PD (optional), ISP, CA, . . . ), respectively.

$Cert_{CA}$ ($PubKey_A$)—A Certificate for a Public Key $PubKey_A$ issued by CA.

$MK_{PD}$—The Manufacturer Key within a PD $ID_{MK}$—The Indicator of a Manufacturer Key.

$CK_{PD\text{-}LCM}$—This is a secure (secret) channel key which is setup between PD and LCM.

EC_ENC(key, C)—Elliptic Curve based Encryption of a content C by utilizing a public key, key.

EC_DEC(key, C)—Elliptic Curve based Decryption of a ciphertext (encrypted text) C by utilizing a private key, key.

EC_DH(A,B)—A random secret value (key) shared between A and B by Elliptic Curve based Diffie-Hellman Key Exchanging Protocol.

ENC(key, C)—Symmetric Key Encryption of a content C by utilizing a secret key, key;

(DEC(key,C)—Symmetric key decryption of a ciphertext C by utilizing a secret key, key;

AIF—Algorithm Identifying Field

API—Applied Program Interface

CCS—Copy Control Status

CDF—Content Description Field

CEK—Content Encryption Key

CertCA (PubKeyA)—Certificate (Data) for PubKeyA issued by CA

CHI—Copyright Holder Information Field

CTC—Copyright, Transfer, Check-in/Check-out

ECC—Elliptic Curve based Cryptosystem

EC_DH(ISP,LCM)—random secret value (key) shared between ISP and LCM by Elliptic Curve (Cryptosystem) based Diffie-Hellman Key Exchanging Protocol EC-ENC—Elliptic Curve-based Encryption of a content by utilizing a public key ENC—Symmetric Key Encryption of a content by utilizing a secret key ICL—Import Control Layer $ID_A$—Identifier of A IP—Information Provider;

ISP—Internet Service Provider including Content Provider via the network

LCM—Licensed SDMI Compliant Module

MKIT—Manufacturer Key Information Table

MKPD—Manufacturer Key within a portable device

PCS—Playback Control Status

PD—SDMI Compliant Portable Device

PDFM—Portable Device Functional Module

PKC—Public Key Cryptosystem

PM—Portable Media (SDMI Complaint Storage Media)

PryKeyA, PubKeyA—Private Key and Public Key of A (A may be LCM, PD, ISP, CA, and the like)

RMF—Right Management Field

RMS-DB—Right Management System-Data Base

RNG—Random Number Generation Unit

SDMI—Secure Digital Music Initiative

SH—Secret Header

SNAKE—Symmetric Key Encryption Algorithm, which is very effective for both software and hardware implements and has been world-wide cryptanalized SOI—Source Originator Indicator Field;

UTD—Update Token Data.

In the above items the Elliptic Curve based Public Key Cryptosystem is just an example as a candidate of Public Key Cryptosystem, and so any public key cryptosystem, for example RSA, can be used instead of it. But we suggest that SDMI Compliant EMD System (Electronic Music Distributing System) adopt the ECC System for the next generation portable devices, since ECC can be efficiently implemented in such small devices with low cost.

Also, an internet service provider includes a content provider as well as an information provider via network. A personal computer or an LCM is examples as a candidate of the first content output unit. A portable device such as MP3 is an example of a second content output unit. A portable medium is a general recording medium including smart media.

FIG. 1 is a schematic view for explaining a system for preventing an illegal copy of digital contents according to an embodiment of the present invention.

A certificate authority 110 generates a first table having the manufacturer key and the manufacturer key data, and a second table having an identifier (ID) of the portable device 150, a token, T, and the information (ENC($MK_{PD}$, T)) of the token encrypted by the manufacturing key. That is, the certificate authority 110 generates the manufacturer key, $MK_{PD}$, and its certificate data, Cert($MK_{PD}$), in accordance with a first registration request signal 121 inputted from a manufacturer 120 of portable devices 150, and outputs a manufacturer key and a manufacturer key data to the manufacturer 120.

The manufacturer 120 of the portable devices 150 outputs the registration request signal 121 to the certificate authority 110 and receives the manufacturer key and the manufacturer key data generated by certificate authority 110 in accordance with the first registration request signal 121.

An internet service provider (ISP) 130 including a content provider via the internet outputs a request signal 131 to the certificate authority 110, receives a pair of keys and the certificate of the key which are generated in the certificate authority 110 in response to the registration request signal 131 of the ISP, and the second table from the certificate authority 110.

A licensed SDMI (secure digital music initiative) compliant module (LCM) 140 as a first content output unit outputs a registration request signal 141 to the internet service provider 130 in order to receive the digital contents, receives the public key and the data of the public key generated in response to the request signal 141, bypasses the data of the manufacturing key of the portable device 150 to the ISP 130, and encodes and outputs the manufacturer key detected from the second table in response to the manufacturer key data.

The portable device 150 as a second content output unit stores the manufacturer key and the manufacturer key data transferred from the certificate authority 110, outputs its manufacturer key to the internet service provider 130 through the LCM 140, and receives the manufacturer key data of the second table, which is encrypted, supplied from the LCM in order to judge if the stored manufacturer key is authenticated.

Figure 2:
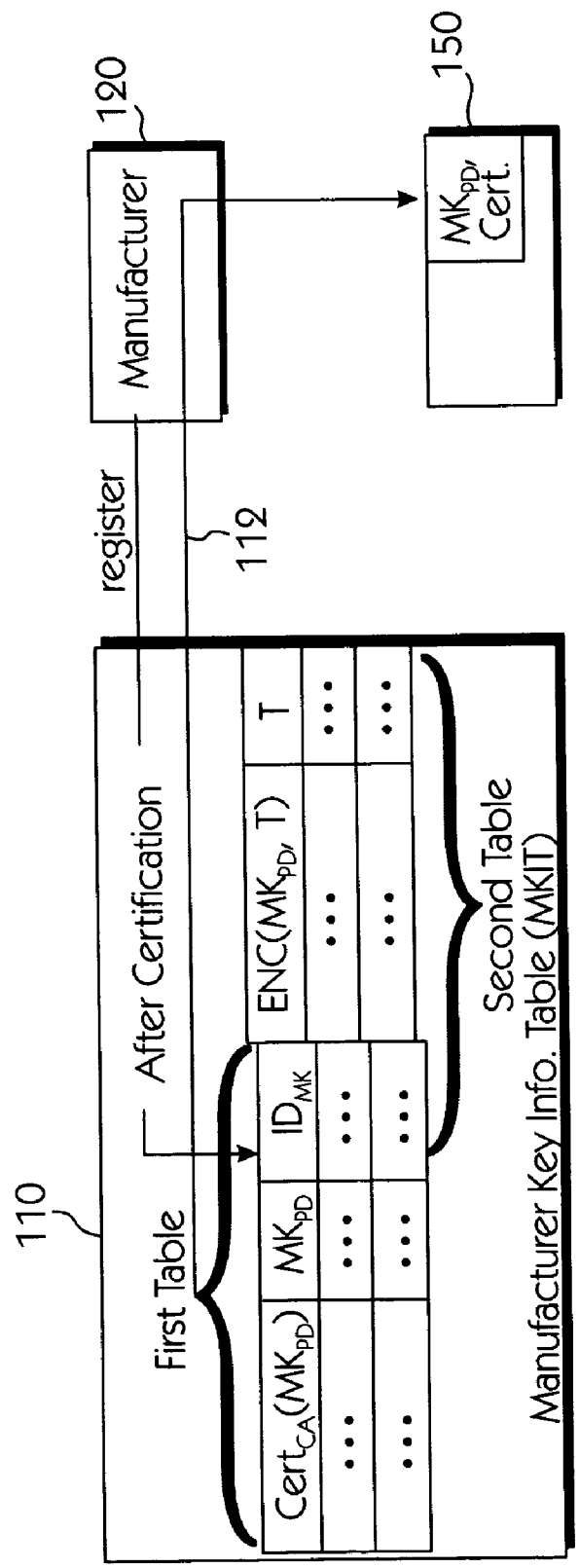
FIG. 2 is a block diagram illustrating a registration by an original equipment manufacture of a portable device with a certificate authority.

The first table, as shown in FIG. 2, contains the manufacturer key data (Cert($MK_{PD}$)), the manufacturer key ($MK_{PD}$), and an identifier ($ID_{MK}$) corresponding to the manufacturer key data and the manufacturer key, and is stored in only the certificate authority 110. Further, the second table is generated from the certificate authority 110 and outputted to the internet service provider 130, and contains the identifier($ID_{MK}$), data (ENC($MK_{PD}$, T)), and a token(T) which is encoded by the manufacturing key.

At this time, the certificate authority 110 forms a first channel key(k) which can be shared with the internet service provider 130 in accordance with the registration request signal 131 inputted from the internet service provider 130, and outputs the first authentication qualification key and the first authentication qualification key data 111 which are encoded into the internet service provider 130 through a secret channel formed by the first channel key(k).

The first channel key is a key generated from encryption of the certificate authority 110 by using the data which the internet service provider 130 has.

Here, we present the minimum substances (algorithms) that are needed for the insurance of the security of LCM and PD. It is assumed that the content compressing and decompressing CODECs are built in each device in either S/W-form or H/W-form.

For the LCM, Public Key Cryptosystem (PKC), Symmetric Key Encryption Algorithm, and Secure Check-in/Check-out System are explained hereinbelow.

Public Key Cryptosystem (PCK) such as ECC, RSA, . . . (ECC is more preferable), is to be used for the secure key setup of LCM, the validity check of ISP's Public Key Certificate, and the secure channel construction between ISP and LCM. Symmetric Key Encryption Algorithm such as SNAKE, is to be used for the content encryption, the authentication to a PD, and the secure channel construction between LCM and PD. Secure Check-in/Check-out System is to be presented in FIGS. 5 and 6 for explaining how to construct this system and how to securely maintain it.

For the PD, Public Key Cryptosystem (PKC), Symmetric Key Encryption Algorithm, and Manufacturer Key, $MK_{PD}$ are explained hereinbelow.

Public Key Cryptosystem (PKC) is an optional to PD 150.

Symmetric Key Encryption Algorithm such as SNAKE, is to be used for the content encryption, the authentication to the LCM, and the secure channel construction between PD and LCM.

Manufacturer Key, $MK_{PD}$, is the pre-set manufacturer key in a temper resistant area within the PD. This is to be used for the secure registration of a PD to LCM.

For the PM, there needs an apparatus or a pre-set special information within a PM to protect contents in it from the dead-copy to another PM. It is desirable, we think, to use the unique ID based approach, that is the method that the manufacturers of PM imbed a unique ID of each PM in the write-protected area of it while they manufacture it. This can be considered as a low cost method to dead-copy protection for the first generation PM.

Regarding the initiation mechanism of the present invention, there are four registration mechanisms relative to ISPs, LCMs, and PDs. The four registration mechanisms include the registrations of the portable device manufacturers to the certificate authority, of ISP to the certificate authority, of LCM to ISP and of the portable device to LCM, and of multiple LCMs or multiple PDs. The manufacturers' registration to CA precedes ahead all the others.

The registration of the portable device manufacturer 120 to the certificate authority 110 is illustrated in FIG. 2.

When the manufacturer 120 requests its registration to CA 110, CA 110 certifies it and then generates a manufacturer key, $MK_{PD}$, and make its certificate data, $Cert_{CA}(MK_{PD})$, to deliver them to the manufacturer 120. At the same time CA 110 generates a random token, T, to make (or update) the Manufacturer Key Information Table (MKIT) for an ISP-registration. Once after the manufacturer 120 gets the data, {$MK_{PD}$, $Cert_{CA}(MK_{PD})$}, the manufacturer 120 can manufacture the portable devices by imbedding those secret data within a temper resistant area of the portable devices.

Therefore, the portable devices 150 manufactured by the manufacturer 120 are authorized by the certificate authority 110 to store the downloaded, encrypted digital contents.

Figure 3:
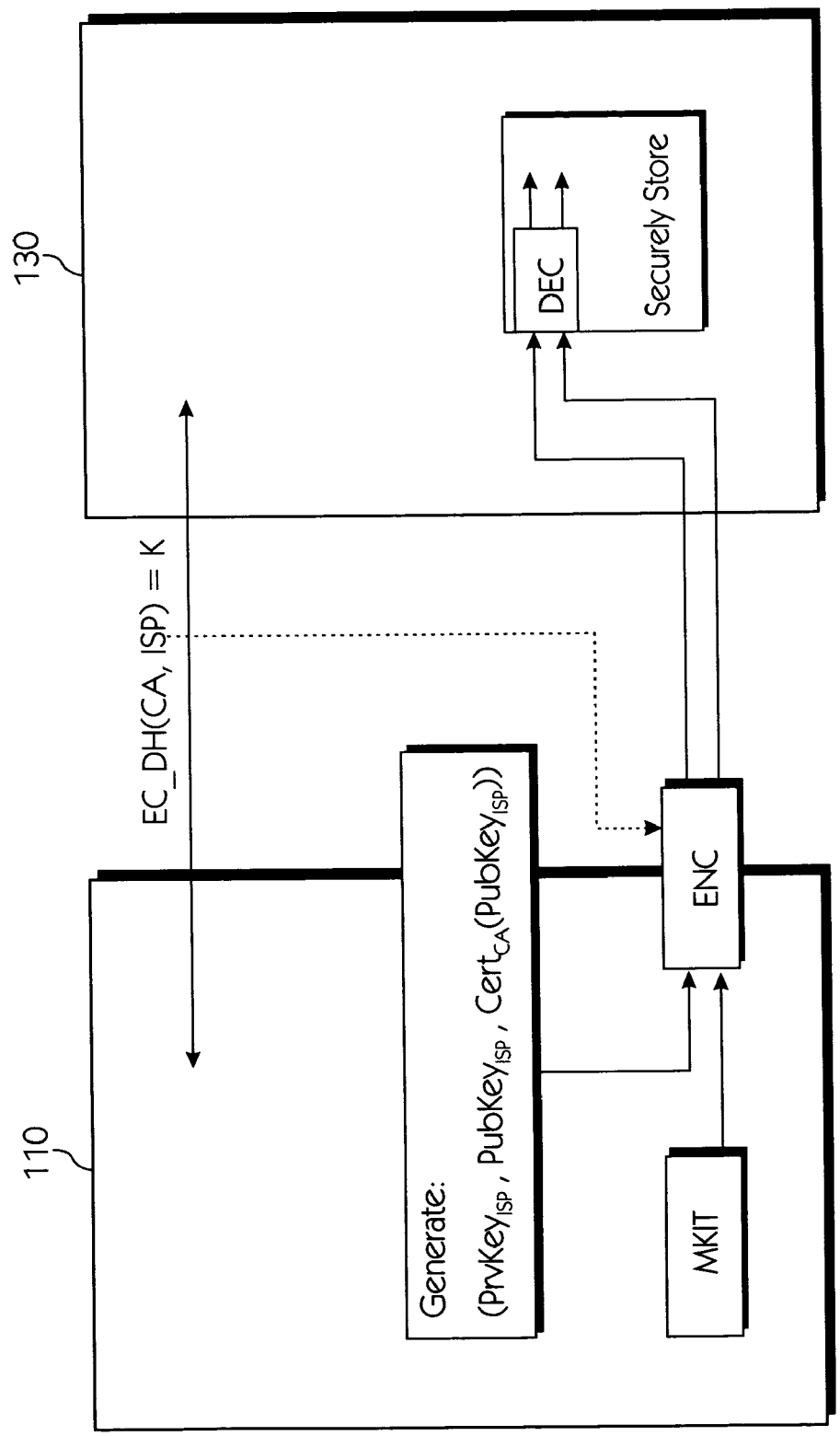
FIG. 3 is a block diagram showing the registration of Internet service provider's registration with a certificate authority.

FIG. 3 shows how for the ISP 130 to register to CA 110 and what information to get from CA 110. For an ISP to register to CA, firstly it generates its ephemeral private-public key pair {$PrvKey_{eph}$, $PubKey_{eph}$} to open a secure channel between CA and itself by EC_DH(CA, ISP) and provide a safe way to communicate each other without allowing an illegal copy of the downloaded information through the channel. A pair of keys and key data {$PrvKey_{isp}$, $PubKey_{isp}$, $Cert_{CA}(PubKey_{ISP})$} are generated and stored in the certificate authority 110, and two tables are formed in dependence with the manufacture key. The certificate authority 110 encrypts and transmits the encrypted key and key data to internet service provider 130 through the channel in order to co-own the key and key data. Secondly the ISP 130 gets its semi-permanent private-public key pair {$PrvKey_{ISP}$, $Cert_{CA}(PubKey_{ISP})$} and the manufacturer key information table data through the secure channel. Where CA's certification to the ISP should be proceded ahead all these procedures. ISP's key pair should be securely stored.

The LCM's key pair should be securely stored, where the host's various system parameters may be used for this goal.

Here the LCM registration mechanism to an ISP together with PD registration is described. As in FIG. 4, LCM gets the ISP's Public Key Information {$PubKey_{ISP}$, $Cert_{CA}(PubKey_{ISP})$} at first and verifies its validity by using the CA's public key Information which was already announced or preset within the LCM in a code-imbedded-like method.

If the validity of the certificate for the ISP's public key is certified, the LCM 140 executes the handshaking protocol to get an ephemeral shared key by utilizing Elliptic Curve based (or other PCK based) Key Exchanging Protocol. Through this secure channel, the ISP can deliver in safe the LCM's permanent private-public key pair for a static secure communication and a secure content transaction between the LCM and the ISP. When a request signal 151 is transmitted from the portable device 150 to the LCM 140, the portable device 150 tosses the certificate data for its ID of the manufacturer key to the LCM 140. The LCM 140 sends them to its connected ISP 130 in the encrypted form, EC_ENC(PubKey$_{ISP}$.Cert$_{CA}$(ID$_{MK}$)).

The internet service provider 130 decrypts the encrypted information and compares the decrypted information with the information of the second table. If the decrypted information is identical to the information of the second table, the internet service provider 130 encrypts the content of the table and transmits it to the LCM 140 in a secure manner. The LCM 140 decrypts the encrypted information to obtain the information of the token. For the LCM 140 and the portable device 150 to set up a shared secret key and to complete the portable device registration, the LCM 140 randomly generates their static and secret channel key, CK$_{PD-LCM}$, and encrypts and sends ENC(T,CK$_{PD-LCM}$)||T*. Upon receiving these data, the portable device 140 can extract the token value T from T* by using the manufacturer key and, by using this token, the portable device 140 can also compute CK$_{PD-LCM}$ and store it. As the portable device 140 securely stores this channel key, the portable device registration is finished.

The channel key, CK$_{PD-LCM}$, may be originated from portable device 150 instead of LCM 140. In this case the portable device 150 receives the data T* from the LCM and gets the token T by decrypting T* with its manufacturer key. And then the portable device generates a random channel key CK$_{PD-LCM}$ to upload ENC(T, CK$_{PD-LCM}$) to LCM.

The part of the record in the manufacturer key information table (MKIT) of the LCM 140 stays in encrypted form by using the LCM's secret key (this key may be LCM's public key).

In practice, during the portable device 150 registration to LCM 140, an update token data (UTD) of Right Management System-Data Base (RMS-DB) should be transferred from the portable device 150 to the LCM 140 (or from the LCM 140 to the portable device 150) together with CK$_{PD-LCM}$ and be set both in the RMS-DB and in the portable device. Therefore, all the units and terminals in this system are authorized to transmit and receive the encrypted digital contents between the units and terminals.

As shown in FIG. 1, the architecture and the file format of the present invention can allow users to register their own limited number of LCMs or PDs. The number may be limited by ISP or by CA.

To register a plurality of LCMs, since ISP maintains the private-public key pair of the firstly registered LCM of a user's multiple LCM's, ISP can securely deliver the same key pair to the another LCM of the user's.

Figure 4:
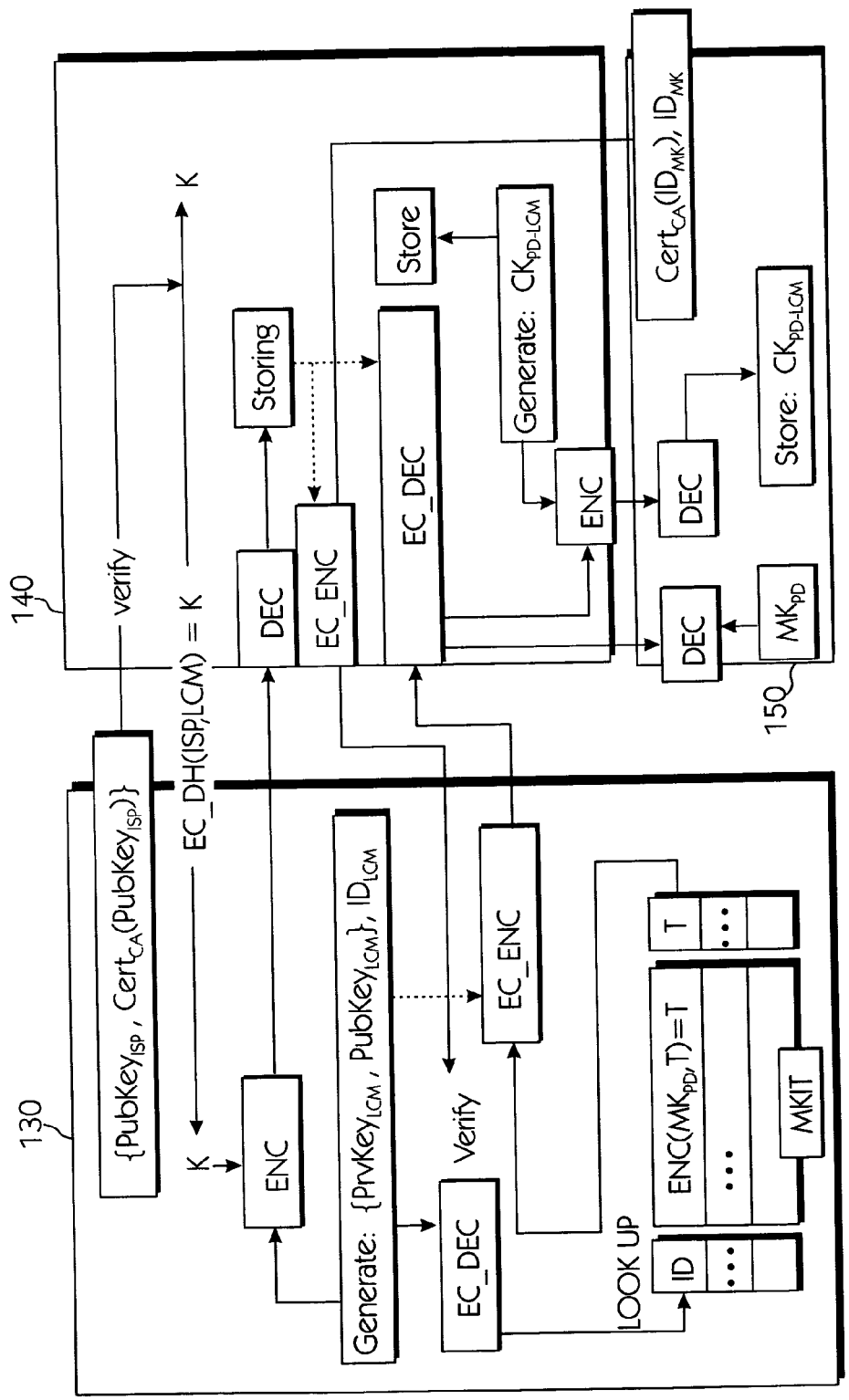
FIG. 4 is a block diagram showing the registration of a personal computer and a portable device with an Internet service provider.

To register a plurality of portable devices, since LCM securely maintains the secret channel key between the LCM and PD, the LCM can securely deliver the same key pair to the another portable device of the user's in the same manner depicted in FIG. 4.

Figure 5:
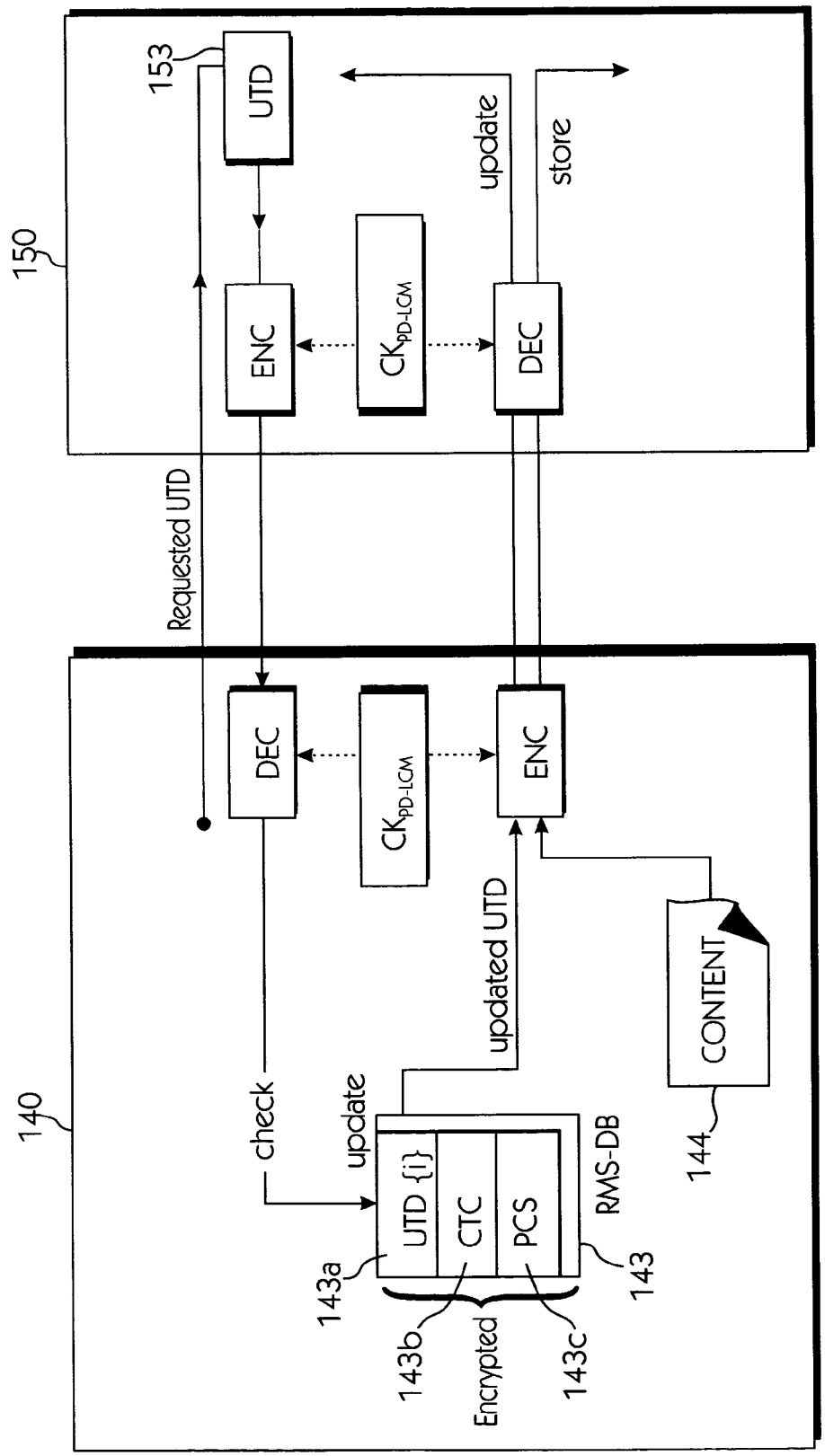
FIG. 5 is a block diagram showing usage rules governing a database of a right management system.

FIG. 5 shows exemplified implementation for the management rule of RMS-DB when a content downloading occurs.

To manage the information CTC={Copyright, Transfer, Check-in/Check-out}, the LCM 140 maintains the Right Management System Database 143, named RMS-DB in a secure manner. The Right Management System is described, focusing on the content transaction between LCM 140 and PC 150.

The RMS-DB contains an update token data area 143a, a title, CTC (copyright, transfer, check-in/check-out) field 143b, a playback control status data area 143c (PCS: the permitted times to play, the amnesty period, . . . ).

The part of the record in RMS-DB (in LCM) stays in encrypted form by using the LCM's secret key such as CK$_{PD-LCM}$.

The UTD part 143a may have a few number of Updating Token Data depending on the number of a user's own PDs.

The most important area in the database is the update token area 143a, and the update token area 143a has different values when the update token area 143a downloads a digital content from the LCM 140 to the portable device 150, or uploads the digital content from the portable device 150 to the LCM 140. At this time, the update token is transmitted to the LCM 140 through the portable device 150 to update the stored token in the LCM 140.

A portable device import control is a layer existing in the LCM 140 to import SDMI Compliant contents from ISPs or to import non-SDMI Compliant outsource contents (e.g. RedBook CD, DVD, . . . ). Therefore, this layer should contain such capabilities as the followings:

Trans-Coding to make PD decompress the input with its CODEC,

Trans-Encrypting to make PD decrypt the input with its Encryption System, and

Converting the input to SDMI Compliant the format.

PD Interface has the following capabilities:

Authenticating to PD, and opening a secure channel between LCM and PD.

ISP Interface has the following capabilities:

Authenticating to PD, and opening a secure channel between LCM and PD.

Functional Components in PDFM has LCM Interface and Import Control within PDFM.

LCM Interface has the following capabilities:

Authenticating to LCM, and opening a secure channel between PD and LCM.

The import control within the portable device has the capability to import a outsource analog input and to make it fit to the SDMI Compliant file format. Where the converted SDMI Compliant content should have the binding information to the PD to be played only via the PD.

Figure 6:
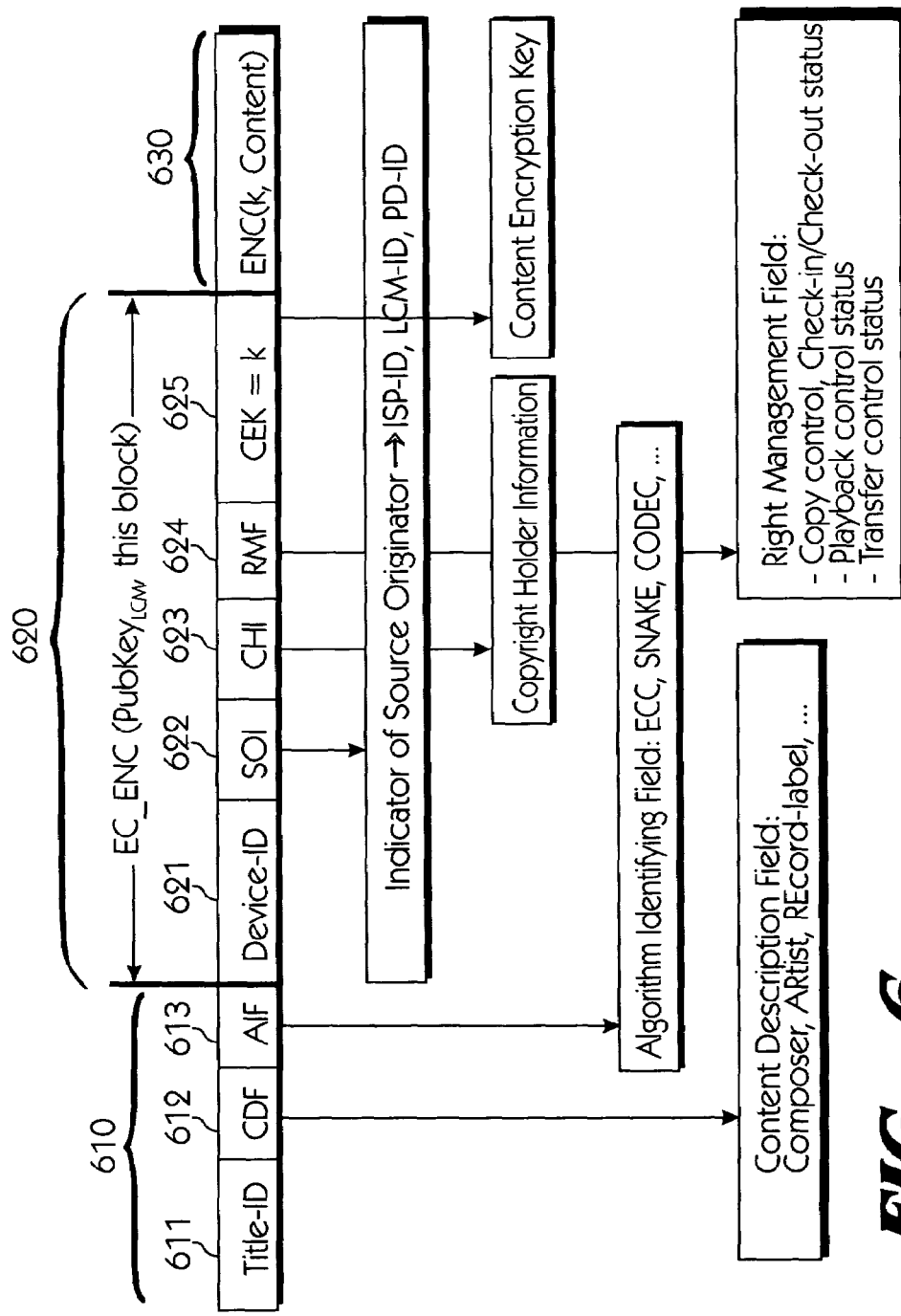
FIG. 6 is an exemplified format.

FIG. 6 shows an exemplified file format.

As shown in FIG. 6, the SDMI compliant file contains a plain header 610, a secret header 620, and a file body 630. The plain header 610 comprises a title-ID 611, a content description field (CDF) 612 (e.g., Title, Composer, Artist, Record-label), and an algorithm identifying field (AIF) 613. The secret header 620 contains a device-identifier 621 (i.e., LCM_ID, PD_ID, or PM_ID), a source originator indicator field (SOI) 622 (i.e., ISP, LCM (CD-ripping, Audio input), PD (Analog input), or Kiosk), a copyright holder information field (CHI) 623, a right management field (RMF) 624, and a content encryption key 625. The file body 630 contains a symmetric key encryption of content by utilizing a secret key (ENC(k, Content)).

Right management field 624 contains the Copy (e.g., Copy-Never/Copy-Free/No-More-Copy mode), Check-In/Out mode, Transfer mode (i.e., transferable or not) and Playback Control Status (e.g., allowable number of times to be played (unlimited or n-times), expiration date, and amnesty period), which are to be encrypted by secret key of the device.

The rules to transfer contents securely over ISP-LCM-PD-PM are as follows.

When the ISP receives a content downloading request from the LCM, it confirms the LCM's ID and then downloads the content with the file format of FIG. 6 to the LCM. For the LCM to play the reached content, it follows the following steps in this order.

First, the LCM finds out the encryption algorithm from the field AIF 613 in PH 610.

Second, the fields in the secret header 620 are recovered by using the found out encryption algorithm and LCM's secret key (private key) to recover the fields in SH.

Third, the Device-ID field 621 is compared with the ID of the LCM to check if there is correspondence between the two.

In the case of correspondence, the copy control status from the RMF data, the playback control status, and the transfer control status are identified to register them in the database(RMS-DB) which the LCM 140 has.

After the above process is performed, the digital content encryption key is extracted by using a CEK field, and the encoded digital content is interpreted by using the encryption key.

If any of the above lists is not violated, the music can be played.

If it is needed to modify the RMF624, especially the Playback Control Status (PCS), the LCM 140 has to update the data both in the file and in the RMS-DB following the controlling direction.

In the case of changing the RMF 624 of the file formats, in particular the playback control status, the LCM 140 replaces the playback control state data in two places of the database(RMS-DB) and the file format with desired data.

The procedure for the LCM 140 to download the content to its portable device 150 includes the following steps:

First, the LCM 140 requests the PD-ID and UTD to the portable device 150.

Second, the portable device 150 sends the ENC (CK$_{PD-LCM}$, UTD||PD-ID) to the LCM 140.

Third, the LCM 140 recovers the PD-ID and confirms it.

Fourth, the LCM 140 recovers the UTD and the fields in the secret header 620 and compares them with those in its RMS-DB. If UTD is correct and if any alteration of RMF is needed, the LCM updates the contents of RMF both in RMS-DB and in the file format.

Fifth, the LCM 140 updates UTD of RMS-DB with a newly generated UTD, and ENC (CK$_{PD-LCM}$, UTD*) is to be sent to the PD.

Sixth, where the Transfer Control Status field has the three types, "Transfer", "Transferred", and "Transfer-non", and the Transfer Control Status indicates "Transfer", "Transfer" is replaced with "Transferred" in the Transfer Control Status field in RMS-DB, but not in the file format. Where the Transfer Control Status field has the three types, "Transfer", "Transferred", and "Transfer-non".

Seventh, if the Copy Control Status (CCS) indicates "Check-in", it is replaced by "Check-out" in the Copy Control Status field both in RMS-DB and in the file format.

Eighth, if the Copy Control Status (CCS) indicates "Copy-Never", the content downloading to the portable device is denied.

If any of the above lists is not violated, the content is downloaded to the PD.

Hereinafter the process of the digital contents between the portable device 150 and the portable recording medium 160 as a content storage medium for preventing an illegal copy in downloading the digital content, which the portable device has, to the portable medium 160 is explained.

Firstly, if there is its owned ID in the portable medium 160, the portable device 150 records the digital contents which are encrypted by using the ID.

Secondly, if there is its owned ID in the portable medium 160, the portable device 140 records the digital contents which are encrypted by using randomly generated key. The randomly generated key T is encrypted by using a key, S, of the general secret key which is predetermined by the manufacturer 120 of the portable device 150.

The encrypted T is recorded on the hidden area of the PM.

Where there is its own ID in the portable medium 160, all contents within the portable medium can be played by all the portable devices, but, where there is not its own ID, all contents within the portable medium 160 can be played only by the portable devices produced by the manufacturers which adopted this system. Anyway it is certain that this system can support the portability of contents via the portable media.

As previously we defined, the "Transferability" is a different concept from the "Portability" of a content. The main difference is that the content with "Transferability" can be not only played in any portable devices but also uploaded to any LCMs, but not in the case of "Portability". Since the present system has and manages the Transfer Control Status field both in the RMS-DB and in the file format, the present system can support the transferability of the content. If there is marked "Transfer" in the field of a content and if the content is just downloaded to the portable device, then the LCM downloads it to the portable device and replaces "Transfer" by "Transferred" in the relevant field of RMS-DB. Then the content, which has been downloaded to the portable device, can no longer be played in the LCM until it is uploaded to the LCM again, but the downloaded content in the portable medium 160 can be played by any portable device and can be uploaded to another LCM via the portable device.

If the Copy Control Status (CCS) of a content contained in a portable medium indicates "Copy-Free", the content can be uploaded to any LCMs.

Figure 7:
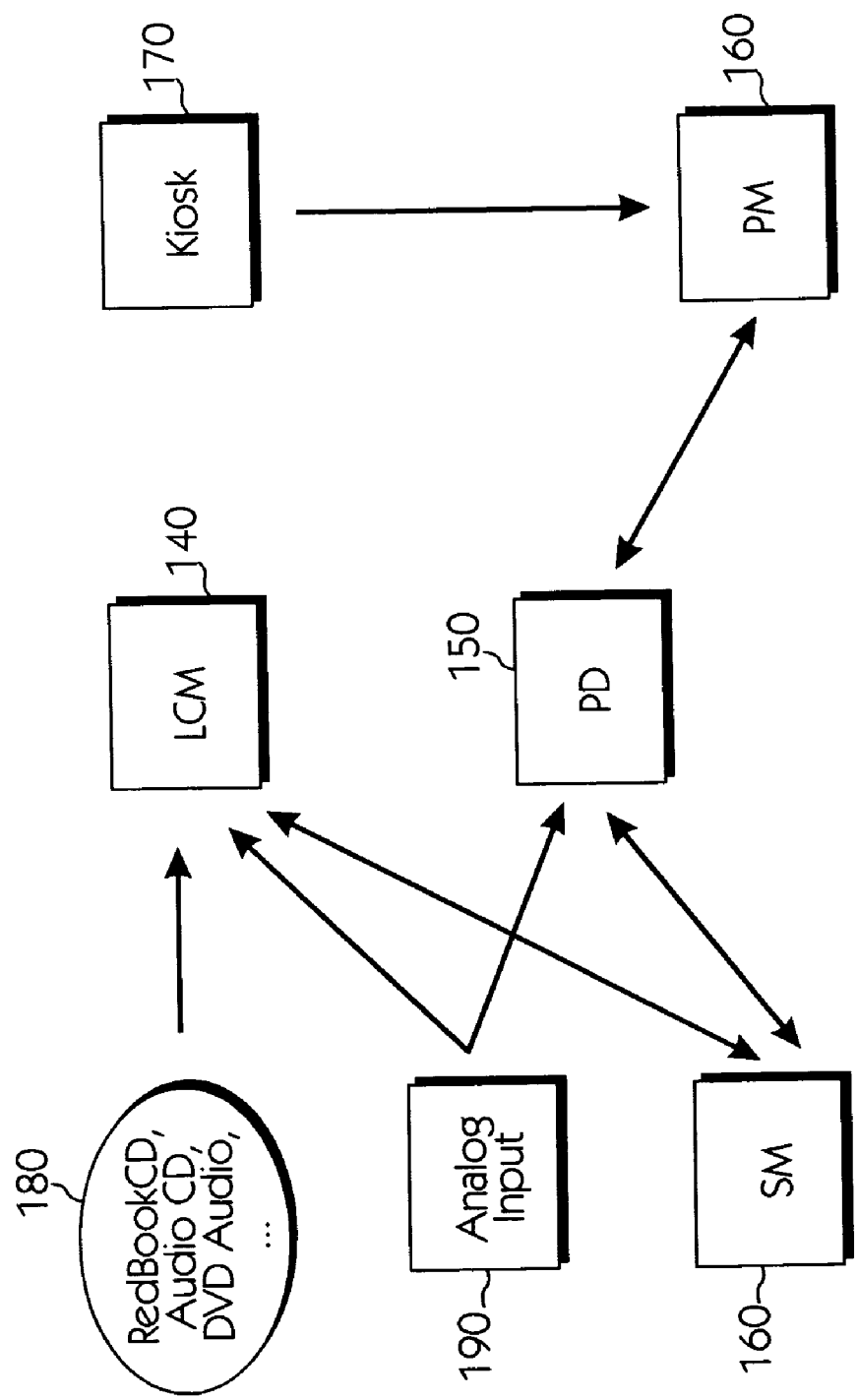
FIG. 7 is a block diagram showing the basic architecture for various inputs.

As shown in FIG. 7, various inputs such as originated from RedBook CD, Audio CD, Super Audio CD, DVD Disk, and analog Device are allowable to LCM optionally. An analog input to PD is also allowable. The secure import control for those several inputs to LCM or to PD is presented hereinbelow.

The audio signal inputted through the input devices is inputted to the LCM 140, and encoded according to a system supported in the present invention, and then transmitted to the portable device 150, or transmitted to the portable medium 160 to be reproduced through the portable device 150.

The kiosk 170 generates a registration request signal for selling an encoded digital content by the internet service provider 130 through the LCM 140. Therefore, the internet service provider 130 provides to the kiosk 170 the portable medium 160 having digital contents encoded by the system supported in the present invention according to the registration request signal, and the kiosk receives fees from users and transmits the digital contents stored in the portable medium 160. Kiosk 170 is a store or vending machine selling a recording medium or digital content which is reproduced in this system. Machine on Kiosk is regarded as a personal computer having an interface of the digital content portable medium 160. The recording medium interface can be used by anyone having a supply agreement with an intellectual property right owner or the digital internet service provider.

Figure 8:
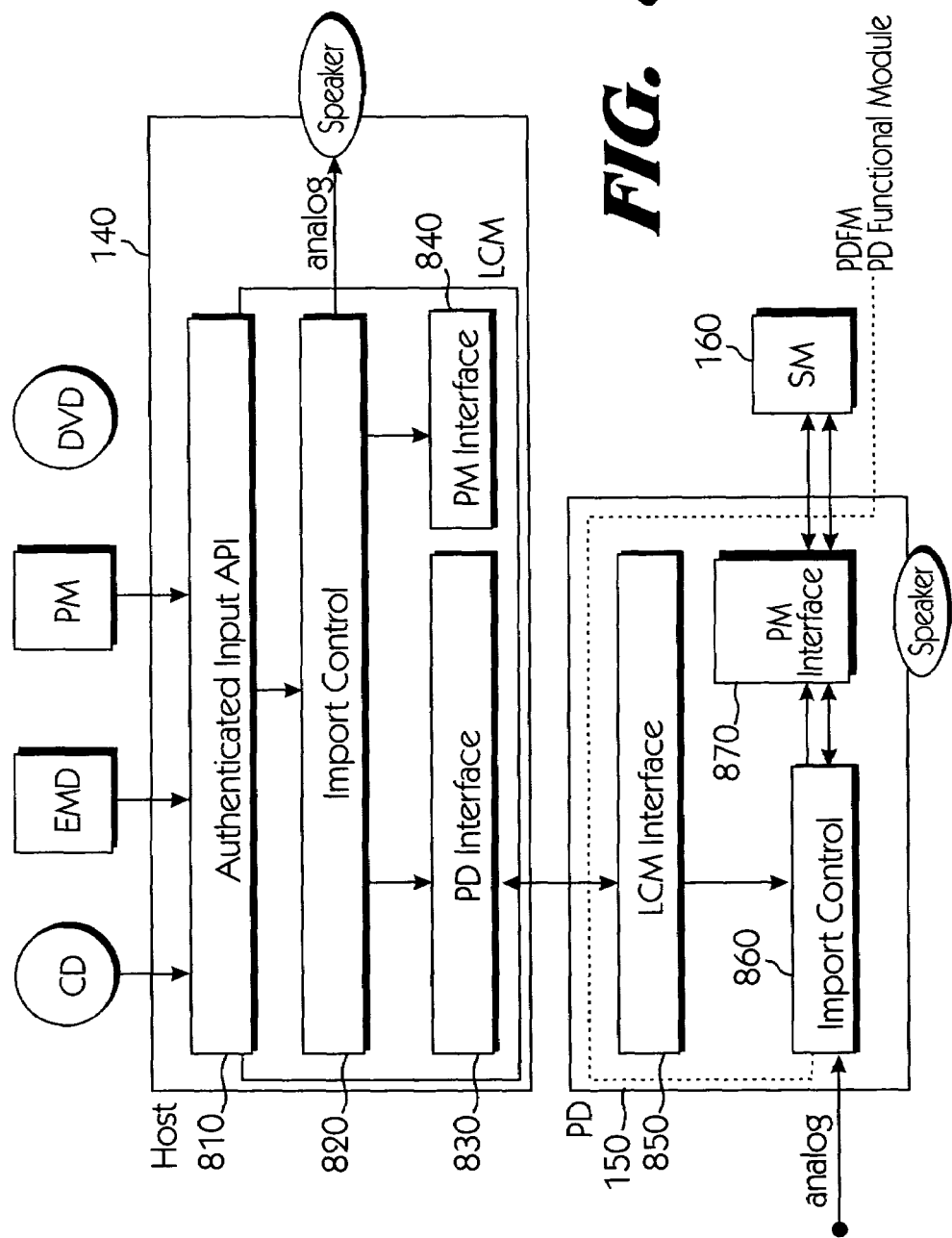
FIG. 8 is a block diagram showing control of outsource import.

FIG. 8 is a view for showing an output source of FIG. 7 capable of being additionally connected to the embodiment of the present invention.

As shown in FIG. 8, the host device, in which the LCM module exists, has at least the following three layers (two of these exist in the LCM module).

Authenticated Input API 810 has the roles of confirming the validity of the input and extracting some required information to convert the input into a SDMI Compliant format.

With respect to the role of confirming the validity of the input, if the input data have a watermark, then this API should be able to detect it.

If the input data take an encrypted (or scrambled) form, then this API should be able to extract its encryption key and the encryption (or scrambling) algorithm.

If the input data do not take any protected form, then the API should confirm the validity of written format of the media containing the input data.

The API checks if an input device and data inputted from the input device are suitable for the system and transmits the following data to the import control layer 820.

The required data for the API to pass over to the Import Control Layer are as follows: Information of the media (source) type (e.g., Audio CD, DVD Audio, Information of the originator of the input content, Information of the content (e.g., Title, if any, Player, Artist), Information of the encryption algorithm if any, Information of the encryption key if any.

The Import Control Layer 820 gets a bundle of information from the Authenticated Input API and reconstructs the input content to meet a SDMI Compliant file format by following the rules listed below:

Copy Control Status is marked as "Copy-Never" or "Check-in/Check-out" (optionally).

Playback Control Status is marked as "Times to playback=infinite or N" (N: optional).

Transfer Control Status is marked as "Transfer-Non".

Mark the "LCM-ID" into the SOI field and Device-ID field of SH (Secret Header)

If the input content is not encrypted, a random key is generated and encrypts the input content by the random key. If the input content takes an encrypted form by other encryption algorithm different from the PD's, then this layer trans-encrypts the content to be played in the PD.

The secret header part is encrypted by LCM's public key.

PD Interface layer 830 authenticates the connected portable device 150 by checking whether the portable device 150 has its correct ID and the secret channel key, $CK_{PD\text{-}LCM}$. The Kerberos Authentication Protocol may be used (refer to: A. J. Menezes, P. C. Oorschot, and S. A. Vanstone, *Handbook of Applied Cryptography*, pp. 401–403, CRC Press, 1996).

The Import Control Layer (ILC) 860 within the portable device 150 makes a SDMI Compliant compressed digital content from the analog input by following the rules listed below:

Upon reception of each frame of the analog input, the ICL encodes the frame and by a randomly generated key. If all the frames have been encrypted, the next steps are followed.

Copy Control Status is marked as "Copy-Never" or "Check-in/Check-out" (optionally)

Playback Control Status is marked as "Times to playback=infinite or N" (N: optional).

Transfer Control Status is marked as "Transfer-Non".

The "PD-ID" is marked into the SOI field and Device-ID field of SH (Secret Header)].

The portable device encrypts the secret header part by channel key.

If the converted SDMI Compliant content from the analog input has its SOI field 622 of the Secret Header with marked "PD-ID", then the procedure of writing the content on a portable medium (PM) does not use the unique ID of the PM. This means that such content as made from an analog input to a portable device is not allowed to have the "Portability".

Hereinafter, the copy protection scheme for portable media is described.

PM may optionally support unique ID for first Generation PM. If the unique ID is not supported, the physical address of a bad sector of the portable medium is used instead. If unique ID is supported, it should be one-time writeable during the manufacturing stage only, and readable only by the portable device with a special command.

Channel key (CK) is a shared key between LCM and PD. To support portability, CK is not considered as input to function f( ). If CK is included, it provides additional security to the content stored in PM. CK may take various forms depending on the application usage and right management rules.

With respect to a physical address of bad sector of a portable medium, P, the usage of P prevents the playback of illegally copied content from PM to PM by simple "deadcopy".

Referring to a spared area, a special command known only to the manufacturer needs to be known to access this area.

Figure 9:
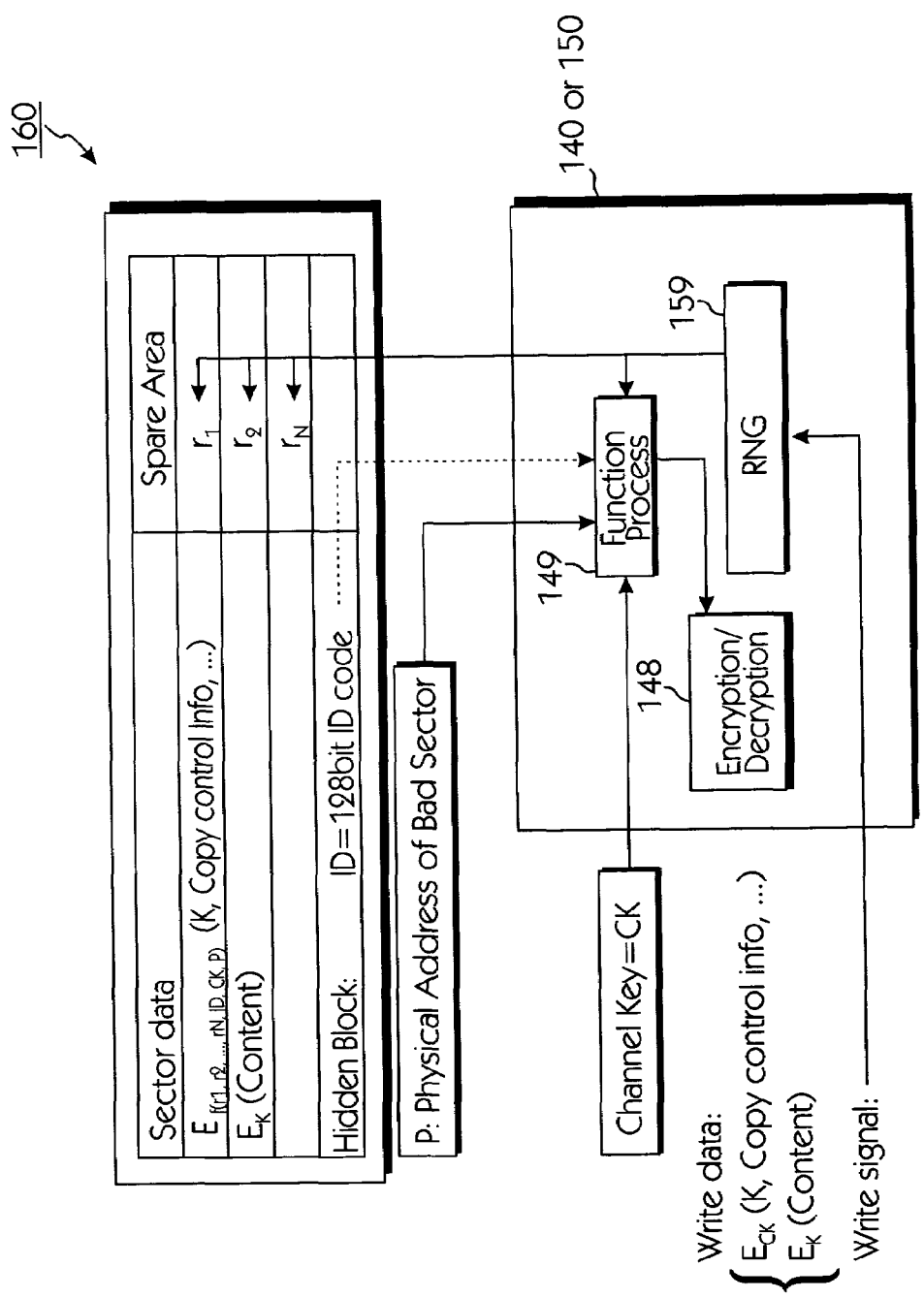
FIG. 9 is a block diagram showing a copy protection system for portable media.

The copy protection system for the portable media is shown in FIG. 9.

First, the portable device 150 and the LCM 140 share a channel key to form a secure channel between them.

The portable device 150 receives as inputs and function processes a physical address of a bad sector of the portable medium 160, a random number, and a secret channel key which is transmitted from the LCM 140 and stored in the LCM 140. With the processed value, the portable device 150 encrypts a header of the digital contents and transmits it 160. Hash function or one way function can be used for the function process. At this time, what generates the key for encryption is the function process means 149.

Function process means 149 receives as an input the physical address of the bad sector transmitted from the portable medium 160 and receives as an input the random number through the random number generating means (RNG) 159. The random number is also transmitted and stored in a spare area of the portable medium 160.

The portable medium 160 transmits the physical address of the bad sector, stores a random number generated in the portable device 150 as an input in the spare area, and stores as sector data the encrypted header information encrypted by the processed value and the encrypted digital content inputted through the portable device 150.

It is optional to encrypt the header of the digital content by function processing after receiving all of the commonly owned key, random number, and the physical address of the bad sector or one of the commonly owned key, random number, and the physical address of the bad sector.

The digital content can be downloaded to the portable medium 160 through the portable device 150 or directly from the LCM 140.

Even if the portable medium is copied to another portable medium, the digital content in the portable medium cannot be reproduced from the portable medium. Therefore, this invention provides the effect on basically protecting illegal copy.

As stated above, the preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A system for preventing an illegal copy of digital content, said system receiving and decrypting encrypted digital content and reproducing the digital content, comprising:
    a certificate authority for generating manufacturer key information and generating first key information for giving an authorization to supply said encrypted digital content;
    a portable terminal supplier supplying a portable terminal, said portable terminal supplier outputting a first registration request signal to said certificate authority and receiving the manufacturer key information generated by said certificate authority in accordance with the first registration request signal, said portable terminal supplier imbedding the manufacturer key information in said portable terminal;
    a content supplier transmitting a second registration request signal to the certificate authority, said certificate authority and said content supplier sharing a first secret channel, said content supplier receiving and storing said first key information from the certificate authority through said first secret channel for supplying said encrypted digital content, said content supplier generating and outputting second key information for giving an authorization to receive and reproduce said encrypted digital content;
    a personal computer outputting a third registration request signal to the content supplier for obtaining said second key information, said personal computer having public key information of said certificate authority, said personal computer and said content supplier sharing a second secret channel, said personal computer verifying said first key information inputted from the content supplier by using said public key information of said certificate authority and receiving the second key information through said second secret channel, said personal computer receiving said encrypted digital content through said second secret channel; and
    said portable terminal manufactured by said portable terminal supplier for reproducing said digital content, said portable terminal transferring the imbedded manufacturer key information to said content supplier through said personal computer to be verified by said content supplier, said portable terminal and said personal computer sharing a third secret channel for transferring said encrypted digital content between said portable terminal and said personal computer.

2. The system as claimed in claim 1, wherein the certificate authority generates a first channel key shared with the content supplier to form said first secret channel, the first key information is encoded by said first channel key and then transferred to said content supplier, and said content supplier decodes the encoded first key information by said first channel key.

3. The system as claimed in claim 1, wherein the content supplier generates a second channel key shared with the personal computer to form said second secret channel, and the second key information is encoded by said second channel key, and then transferred to said personal computer.

4. A system for preventing an illegal copy of digital content, comprising:
    a certificate authority for generating manufacturer key information comprising a manufacturer key and a manufacturer key data in response to a first registration request signal inputted from an external source, generating first key information for giving an authorization to supply said digital content, said certificate authority generating a token to make an information table, said information table comprising a first table containing the manufacturer key data, the manufacturer key, and an identifier corresponding to the manufacturer key, and a second table containing said identifier, token information encrypted by said manufacturer key, and said token;
    a content supplier transmitting a second registration request signal to the certificate authority for supplying said digital content, said certificate authority and said content supplier sharing a first secret channel, said content supplier receiving and storing said first key information and said second table from the certificate authority through said first secret channel, said content supplier generating second key information;
    first content output means for outputting the digital content, said first content output means sending a third registration request signal to the content supplier for downloading said digital content from said content supplier, said first content output means having public key information of said certificate authority, said first content output means and said content supplier sharing a second secret channel, said first content output means verifying said first key information inputted from the content supplier by using said public key information of said certificate authority and receiving the second key information through said second secret channel, said first content output means extracting the manufacturer key information from said second table, and encoding and outputting the manufacturer key information; and
    said second content output means for recording and reproducing said digital content, said second content output means storing the manufacturer key information, said second output means transferring said manufacturer key information to said content supplier through said first content output means to be verified by said content supplier, said second content output means receiving said manufacturer key information of said second table from said first content output means to decide if the manufacturer key is authenticated, said second content output means and said first content output means sharing a third secret channel for transferring said digital content between said second content output means and said first content output means.

5. The system claimed in claim 4, wherein a content storage means is further included in at least one of said second content output means and said first content output means, and said content storage means stores said digital content.

6. The system claimed in claim 4, wherein the certificate authority generates a first channel key shared with the content supplier to form said first secret channel, the first key information is encoded by said first channel key and then transferred to said content supplier, and said content supplier decodes the encoded first key information by said first channel key.

7. The system claimed in claim 4, wherein the content supplier generates a second channel key shared with the first content output means to form said second secret channel, and the second key information is encoded by the second channel key, and then transferred to said first content output means.

8. The system claimed in claim 4, wherein the token is randomly generated by the certificate authority.

9. The system claimed in claim 6, wherein the first content output means generates a third channel key shared with the second content output means to form said third secret channel, and the first content output means encodes the third channel key with said token inputted from the content supplier and transmits the third channel key to the second content output means.

10. The system claimed in claim 9, the second content output means decodes the encoded token transmitted from the first content output means by using the stored manufacturer key, decodes and stores the third channel key by using said token.

11. The system claimed in claim 9, further comprised of:
said first content output means including a database which has reproduction data of the digital content downloaded from the content supplier, said first content output means encoding the database by using the third channel key for storage, interpreting the reproduction data of the digital content by using the third channel key to thereby judge if an illegal copy of the digital content is performed; and
said second content output means receiving said reproduction data from said first content output means, updating the reproduction data whenever any content downloading or uploading session between said first content output means and said second content output means occurs, and transmitting the updated reproduction data of the digital content to the first content output means.

12. The system claimed in claim 11, wherein the database is separated with an identifier data area of the digital content, an updated token data area, a data area for a present state of the digital content, and a reproduction control data area, and has the corresponding data.

13. The system claimed in claim 12, wherein the data area for the present state of the digital content comprises:
first data indicating that the digital content is downloaded in a copy form from the first content output means to the second content output means;
second data indicating that the digital content is downloaded in a transmission form from the first content output means to the second content output means; and
third data indicating that the digital content is downloaded and uploaded between the first content output means and the second content output means.

14. The system claimed in claim 12, wherein the reproduction control data area of the digital content includes:
fourth data for reproduction times of the digital content;
fifth data for a reproduction expiration period of the digital content; and
sixth data for an amnesty period of the digital content.

15. A system for protecting a illegal copy, comprising:
a terminal receiving a physical address of a bad sector of a storage medium, said terminal generating a random number and storing said random number in a spare area of said storage medium, said terminal having a secret channel key, said terminal function-processing said physical address, said random number and said secret channel key to obtain a processed value, said terminal encrypting a header of the digital content by the processed value; and
said storage medium transmitting said physical address of the bad sector, storing said random number as a key value generated from said terminal, storing as a sector data the encrypted digital content and the header of the digital content encrypted by using the processed value.

16. A system for protecting an illegal copy of digital content, comprising:
a certificate authority for generating manufacturer key information and generating first key information for giving an authorization to supply said digital content;
a terminal supplier supplying a terminal, said terminal supplier outputting a first registration request signal to said certificate authority and receiving the manufacturer key information generated by said certificate authority in accordance with the first registration request signal, said terminal supplier embedding the manufacturer key information in said terminal;
a content supplier sending a second registration request signal to the certificate authority, said certificate authority and said content supplier sharing a first secret channel, said content supplier receiving and storing said first key information from the certificate authority through said first secret channel for supplying said digital content, said content supplier generating and outputting second key information for giving an authorization to receive and reproduce said digital content from said second key information;
a personal computer sending a third registration request signal to the content supplier for obtaining said second key information, said personal computer having public key information of said certificate authority, said personal computer and said content supplier sharing a second secret channel, said personal computer verifying said first key information inputted from the content supplier by using said public key information of said certificate authority and receiving the second key information through said second secret channel, said personal computer receiving said digital content through said second secret channel;
said terminal manufactured by said terminal supplier for reproducing said digital content and reading a storage medium, said terminal transferring the embedded manufacturer key information to said content supplier through said personal computer to be verified by said content supplier, said terminal and said personal computer sharing a third secret channel for transferring said digital content between said terminal and said personal computer, said terminal receiving and function-processing a physical address of a bad sector of the storage medium, a random number generated and stored in a spare area of said terminal and a secret channel key generated in said terminal to obtain a processed value, said terminal encrypting a header of the digital content with the processed value; and said storage medium transmitting said physical address of the bad sector, storing said random number as a key value generated from said terminal, storing as a sector data the encrypted header of the digital content and encrypted header information encrypted by using the result of function processing.

17. The system claimed in claim 16, wherein the certificate authority generates a first channel key shared with the content supplier to form said first secret channel, the first key information is encoded by said first channel key and then transferred to said content supplier, and said content supplier decodes the encoded first key information by said first channel key, the content supplier generates a second channel key shared with the personal computer to form said second secret channel, and the second key information is encoded by the second channel key, and then transferred to said personal computer, and the personal computer generates a third channel key shared with the terminal to form said third secret channel, and the personal computer encodes the third channel key with said token inputted from the content supplier and transmits the third channel key to the terminal.

18. The system claimed in claim 17, further comprised of:
said personal computer having a database which comprises reproduction data of the digital content downloaded from the content supplier, the database encoded by using the third channel key, said personal computer interpreting the digital content by using the third channel key to decide if an illegal copy of the digital content is performed; and
said terminal receiving said reproduction data from said personal computer, updating the reproduction data whenever any content downloading or uploading session between said terminal and said personal computer occurs, and transmitting the updated reproduction data to the personal computer.

19. The system claimed in claim 18, wherein the database is separated with an identifier data area of the digital content, an updated token data area, and a data area for a present state of the digital content, and a reproduction control data area.

20. The system claimed in claim 19, wherein the data area for the present state of the digital content includes first data indicating that the digital content is downloaded in a copy form from the personal computer to the terminal, second data indicating that the digital content is downloaded in a transmission form from the personal computer to the terminal, and third data indicating that the digital content is downloaded and uploaded between the personal computer and the terminal, and the reproduction control data area of the digital content includes fourth data for reproduction times of the digital content, fifth data for a reproduction expiration period of the digital content; and sixth data for an amnesty period of the digital content.

21. A server for preventing an unauthorized copy of digital content, said server comprising:
a first cryptosystem verifying public key information of a content provider by using public key information embedded in said server to check whether said content provider has an authorization to supply said digital content, said server establishing a second secure channel to said content provider to download said digital content from said content provider;
a second cryptosystem encrypting and transferring manufacturer key information embedded in a terminal linked to said server from said terminal to said content provider to be verified by said content provider, said server establishing a third secure channel to said terminal after the validation of the manufacturer key information, said server transferring a token of said content provider to said terminal through said second secure channel and said third secure channel; and
a secure check-in and check-out system for checking a validation of said digital content, said secure check-in and check-out system comprising a right management system having a right management database, wherein information of said digital content corresponding to said right management database is registered to said right management system, said right management database is updated whenever said digital content is downloaded or uploaded between said server and said terminal to check if an unauthorized copy of said digital content is performed.

22. The server of claim 21, wherein said second secure channel is established by executing a handshaking protocol to get an ephemeral shared key by utilizing Elliptic curve based key exchanging protocol.

23. The server of claim 21, wherein said third secure channel is established by a third secret channel key generated in one of said server and said terminal.

24. The server of claim 23, wherein said right management database comprises reproduction data of said digital content, said server encodes said reproduction data by using said third secure channel key, and said server checks said reproduction data by using said third secure channel key.

25. The server of claim 23, wherein said right management database comprises an identifier data area of the digital content, an updated token data area, a data area for a present state of the digital content, and a reproduction control data area.

26. The server of claim 25, wherein the data area for the present state of the digital content comprises:
first data indicating that the digital content is downloaded in a copy form from said server to said terminal;
second data indicating that the digital content is downloaded in a transmission form from said server to said terminal; and
third data indicating that the digital content is downloaded and uploaded between said server and said terminal.

27. The server of claim 25, wherein the reproduction control data area of the digital content comprises:
fourth data indicating reproduction times of the digital content;
fifth data indicating a reproduction expiration period of the digital content; and
sixth data indicating an amnesty period of the digital content.

28. The server of claim 25, wherein said digital content has a first file format comprises:
a plain header comprising a title identifier, a content description field, and an algorithm identifying field from which said server finds out an encryption algorithm and a secret key of said server;
a secret header comprising a device identifier to be compared with an identifier of said server, an indicator of a source origination of said digital content, a right management field including data to be registered to said right management system, and a content encryption key for recovering said digital content encrypted by said content encryption key; and
a file body comprising said digital content encrypted by using said content encryption key.

29. The server of claim 28, further comprising:
an applied program interface confirming a validity of an input and extracting first information from said input;
an import control layer receiving said first information from said applied program interface, said import control layer reconstructing said first information into said first file format; and
a terminal interface authenticating said terminal by checking whether said terminal has a correct identifier and said third secret channel key.

30. A terminal, comprising:
manufacturer key information embedded in said terminal; and
a symmetric key cryptosystem preventing an unauthorized copy of digital content by responding to reception of said manufacturer key information by a server by establishing a secure registration of said terminal with said server, with said terminal establishing a third secure channel to said server and said terminal receiving a token from said server through said third secure channel to reproduce said digital content provided by said server.

31. The terminal of claim 30, further comprising:
a public key cryptosystem, wherein said terminal verifies public key information of said server by using public key information embedded in said terminal to check whether said server has an authorization to download said digital content to said terminal.

32. The terminal of claim 30, wherein said terminal generates update token data whenever said digital content is downloaded or uploaded between said terminal and said server to check if an unauthorized copy of said digital content is performed.

33. The terminal of claim 32, wherein said third secure channel is established by a third secret channel key.

34. The terminal of claim 33, wherein said update token data are encoded and decoded by said third secret channel key.

35. The terminal of claim 30, wherein said digital content has a first file format comprising:
a plain header comprising a title identifier, a content description field, and an algorithm identifying field;
a secret header comprising a device identifier, an indicator of a source origination of said digital content, a right management field, and a content encryption key for recovering said digital content encrypted by said content encryption key; and
a file body comprising said digital content encrypted by said content encryption key.

36. The terminal of claim 35, wherein said terminal is able to write said digital content encrypted by said content encryption key on a storage medium, recover said secret header, and reencrypt said digital content by using an unique identifier in said storage medium, and, if said storage medium does not have said unique identifier in said storage medium, said terminal is able to write said digital content encrypted by said content encryption key on said storage medium, recover said secret header, reencrypt said digital content by using a randomly generated key, and encrypt and write said randomly generated key on a hidden area of said storage medium by using a common secret key embedded in said terminal.

37. The terminal of claim 35, wherein said terminal has an import control layer to convert an analog input to said digital content having said first file format.

38. The terminal of claim 36, wherein said unique identifier is a physical address of a bad sector of said storage medium, said terminal has a random number generator to generate a random number and stores said random number in a spare area of said storage medium, and said terminal has a function-processor function-processing said physical address, said random number and said third secure channel key to obtain a processed value, and said terminal encrypts said digital content with the processed value.

* * * * *